US008279709B2

(12) United States Patent
Choisel et al.

(10) Patent No.: US 8,279,709 B2
(45) Date of Patent: Oct. 2, 2012

(54) LOUDSPEAKER POSITION ESTIMATION

(75) Inventors: Sylvain Choisel, Brussels (BE); Geoffrey Glen Martin, Vinderup (DK); Michael Hlatky, Bremen (DE)

(73) Assignee: Bang & Olufsen A/S, Struer (DK)

( * ) Notice: Subject to any disclaimer, the term of this patent is extended or adjusted under 35 U.S.C. 154(b) by 149 days.

(21) Appl. No.: 12/669,080

(22) PCT Filed: Nov. 5, 2007

(86) PCT No.: PCT/IB2007/054476
§ 371 (c)(1), (2), (4) Date: Jan. 14, 2010

(87) PCT Pub. No.: WO2009/010832
PCT Pub. Date: Jan. 22, 2009

(65) Prior Publication Data

US 2010/0195444 A1 Aug. 5, 2010

(30) Foreign Application Priority Data

Jul. 18, 2007 (DK) ................................ 2007 01060

(51) Int. Cl.
*G01S 3/80* (2006.01)

(52) U.S. Cl. ........................................ 367/127; 367/129

(58) Field of Classification Search .................. 367/127, 367/129
See application file for complete search history.

(56) References Cited

U.S. PATENT DOCUMENTS 6,968,342 B2 11/2005 Wolman et al.
7,139,739 B2 11/2006 Agrafiotis et al.
7,864,631 B2 * 1/2011 Van Leest et al. ............ 367/124
2001/0038702 A1 11/2001 Lavoie et al.
2002/0002555 A1 * 1/2002 Wolman et al. ............... 707/101
2002/0099675 A1 * 7/2002 Agrafiotis et al. .............. 706/15
2002/0143476 A1 * 10/2002 Agrafiotis et al. .............. 702/32
2002/0188180 A1 * 12/2002 Gotschim et al. ............. 600/300
2004/0015525 A1 * 1/2004 Martens et al. ............... 708/208
2005/0065740 A1 * 3/2005 Raykar et al. ................... 702/57
2006/0169051 A1 * 8/2006 Alman et al. ................... 73/762
2010/0135118 A1 * 6/2010 Van Leest et al. ............ 367/124

FOREIGN PATENT DOCUMENTS

WO WO 2006/131894 12/2006

OTHER PUBLICATIONS

International Search Report for PCT/IB2007/054476.

Written Opinion of the Searching Authority for PCT/IB2007/054476.

Groenen, P.J.F,; Van De Velden, N.: Encyclopedia of statistics in behavorial Science, pp. 1280-1289 (Jan. 1, 2005),Wiley Chichester.

Katrijn Van Deun, Luc Delbeke: "Multidimensional Scaling" (Jan. 12, 2000), Open and Distance Learning—Mathematical Psychology.

* cited by examiner

*Primary Examiner* — Isam Alsomiri
*Assistant Examiner* — James Hulka
(74) *Attorney, Agent, or Firm* — Stites & Harbison PLLC; Douglas E. Jackson

(57) ABSTRACT

The invention relates to an automated estimation of the position (co-ordinates) of a set of loudspeakers in a ioom Based on measured impulse responses the distances between each pair of loudspeakers are estimated, thereby forming a distance matrix, and the resultant distance matrix is used by a multi-dimensional scaling (MDS) algorithm to estimate the co-ordinates of each individual loudspeaker An improved co-ordinate estimation can, if desired, be derived by utilizing the stress values provided by the MDS algorithm.

19 Claims, 7 Drawing Sheets

LOUDSPEAKER POSITION ESTIMATION

TECHNICAL FIELD

The present invention relates to a method and system for determining the positions of sound-emitting transducers, such as loudspeakers, for instance in a listening room, one aim of this position estimation being to be able to carry out room corrections of the loudspeakers based on knowledge of the position of the loudspeakers in the room.

BACKGROUND OF THE INVENTION

Often there is a disparity between recommended, i.e. acoustically optimal, location of loudspeakers for an audio reproduction system and the locations of loudspeakers that are practically possible in a given environment. Restrictions on loudspeaker placement in a domestic environment typically occur due to room shape and furniture arrangement. Consequently, it may be desirable to modify signals from a pre-recorded media in order to improve on the staging and imaging characteristics of a system that has been configured incorrectly, i.e. to apply room correction means for instance in the form of digital correction filters to the various input signals prior to the application of these signals to the individual loudspeakers in a practical loudspeaker set-up. The determination of the characteristics of such room correction means, for instance the frequency responses of filters used to shape the response of the individual loudspeakers in the practical set-up, can be based on the knowledge of the room-related co-ordinates of the individual loudspeakers, such as the (x,y,z) co-ordinates in a co-ordinate system in a fixed relationship to the particular room. It is hence needed to be able to determine these co-ordinates, preferably in an automated manner and preferably without the need to utilise separate measurement means, such as a separate microphone or dedicated microphone system. It should thus preferably be possible to provide the characteristics of said room correction means using the loudspeaker system itself.

High-end audio reproduction systems have traditionally found application in homes. Such systems are increasingly concentrating on the imaging characteristics and "sound staging." It is generally a challenge to achieve staging similar to that intended by the recording engineer due to the actual locations of the various loudspeakers in a real listening room for instance at home.

SUMMARY OF THE INVENTION

On the above background it is an object of the present invention to provide a method and system for determining the position of each of a number of sound-emitting transducers, such as loudspeakers, relative to each other. These relative co-ordinates can, if needed, be converted to a room-related co-ordinate system for a given room by a suitable linear transformation.

The above and other objects are in the broadest aspect of the invention attained by a method for estimating the position of N sound-emitting transducers, such as loudspeakers, where $N \geqq 2$, where the method comprises the following steps:

- determining the individual distances $d_{ij}$, or quantities uniquely defining these distances, such as the individual propagation times $t_{ij}$, between any given sound-emitting transducer ($T_i$) and each of the remaining sound-emitting transducers ($T_j$);

- based on said individual distances $d_{ij}$ between any given sound-emitting transducer ($T_i$) and each of the remaining sound-emitting transducers ($T_j$), i.e. based on a distance matrix M comprising the individual distances $d_{ij}$ or based on said other quantities, such as said $t_{ij}$, estimating the relative co-ordinates ($x_i'$, $y_i'$, $z_i'$) of each of said sound-emitting transducers ($T_1, T_2, \ldots T_N$) by means of a multidimensional scaling (MDS) technique or algorithm.

According to a specific embodiment of the invention, the above and other objects are attained by a method for estimating the position of N sound-emitting transducers, such as loudspeakers, where $N \geqq 2$, where the method comprises the following steps:

- for each pair (i, j) of sound-emitting transducers ($T_1$, $T_2, \ldots T_N$) determining the impulse response $IR_{ij}(t)$ by emitting an acoustic signal from one of said transducers of a given pair (i, j) of transducers and recording the resultant acoustic signal at the other transducer of the given pair (i, j) of transducers, thereby attaining a set of impulse responses $IR_{ij}(t)$ for each of said pairs of sound-emitting transducers;
- based on said determined set of impulse responses $IR_{ij}(t)$ determining propagation times $t_{ij}$ for sound propagation from any given sound-emitting transducer ($T_i$) to any other given sound-emitting transducer ($T_j$);
- based on said propagation times $t_{ij}$ determining individual distances $d_{ij}$ between any given sound-emitting transducer ($T_i$) and the remaining sound-emitting transducers ($T_j$) by multiplication of each of said propagation times $t_{ij}$ by c, where c is the propagation speed of sound, whereby a distance matrix M is provided;
- based on said individual distances $d_{ij}$ between any given sound-emitting transducer ($T_i$) and the remaining sound-emitting transducers ($T_j$), i.e. based on said distance matrix M estimating the relative co-ordinates ($x_i'$, $y_i'$, $z_i'$) of each of said sound-emitting transducers ($T_1$, $T_2, \ldots T_N$) by means of a multidimensional scaling (MDS) technique or algorithm.

The above impulse responses can in practice be determined using many different techniques, but according to a presently preferred embodiment of the method according to the invention the impulse responses $IR_{ij}(t)$ are determined using the known maximum length sequence (MLS) technique.

In the method according to the invention, a suitable sound signal is emitted from a given transducer $T_i$ and recorded at a given second transducer $T_j$ of the total set of N transducers. At said second transducer $T_j$, the emitted sound can be recorded either using a microphone that may be provided as an integral part of the second transducer or by the second transducer itself, for instance when the transducer is an electrodynamical loudspeaker, in which case the loudspeaker can both act as a sound emitter and as a sound receptor. The emitted sound signal reaching the N−1 second transducers $T_j$ can either be recorded at one transducer at a time or at all of these N−1 transducers simultaneously.

According to one embodiment of the invention, said propagation times $t_{ij}$ for sound propagation from any given sound-emitting transducer ($T_i$) to any other given sound-emitting transducer ($T_j$) are determined based on the corresponding impulse responses $IR_{ij}(t)$ by determining the maximum or minimum value of the impulse response and determining the sample where the impulse response reaches a value that is V % of said maximum or minimum value, whichever has the greatest absolute value, thereby implicitly assuming that this time value corresponds to the time when the first wave front from a given sound-emitting transducer impinges on a given of said other transducers. Specifically V can be chosen to approximately 10%.

A special case arises where the shape of the listening room and the actual positions of given loudspeakers within the room are such that sound emitted from one or more given loudspeakers in a loudspeaker set-up can not propagate directly to one or more other loudspeakers of the set-up due to wall portions preventing direct sound propagation. This situation could for instance occur in a listening room of an L-shape. This situation results in at least one of the distances between a given pair of loudspeakers determined based for instance on the corresponding measured impulse response being erroneous, thereby leading to an erroneous estimation of the individual co-ordinates of the loudspeakers when the erroneous distance matrix is used by the MDS algorithm to estimate the co-ordinates. An L-shaped room is only one specific case, where such problems could occur, and also other room shapes or obstacles in the room, such as large furniture pieces, could lead to similar problems. According to the invention, this problem is solved by utilising the MDS method's measure of goodness of fit (termed "stress" values within this technique), which is a measure of how well or poorly a given set of determined co-ordinates will reproduce the observed individual distances, i.e. the distance matrix used as input to the MDS algorithm. Thus, if the MDS algorithm is used on an entire set of loudspeakers characterised by a first given distance matrix, where one of the measured distances is erroneous, the MDS algorithm provides a first relatively large stress value for the determined co-ordinates. The MDS algorithm does not, however, provide information on which of the distances of the distance matrix M is/are erroneous. According to the invention, there is provided an error correction method generally comprising subdividing the entire set-up of N transducers in smaller sub-groups of transducers and by means of the MDS algorithm calculating the corresponding stress value of each particular sub-group of transducers.

For the case where all of the transducers are actually located in a plane, i.e. a two dimensional case, as for instance a set-up in a room, where all transducers (loudspeakers) are located at a certain height above the floor, i.e. where the position of all loudspeakers can be defined by co-ordinate sets (x, y, constant), the smallest possible sub-group that can be applied is a four-transducer constellation, as a group of two or three transducers will always have a mapping solution with a stress value of zero. This is analogue to multiple points in a plane. There will be multiple planes that contain the same two points and every three-point constellation will have one possible plane that comprises these three points, no matter how they are located in space. However, for four points, provided they are not located in a two-dimensional plane, it is not possible to find a plane that contains all four points. Therefore, in two dimensions, the stress value can be seen as an indication of how far the points are away from the ideal two-dimensional plane that would contain all points, i.e. bow far the points would be displaced into the third dimension. In case of a three dimensional set-up of transducers (in practice for instance placement of loudspeakers at different heights above the floor of a room), the sub-groups must comprise at least five transducers. In general a sub-group must comprise $N>N_{dim}+1$ transducers, where $N_{dim}$, is the number of dimensions, i.e. the number of co-ordinates that are not restricted a-priory and that are determined by using the MDS technique according to the method of the present invention.

Thus, according to a specific embodiment of the error correction method of the invention, the total set-up of sound-emitting transducers N (where N>4) is subdivided into all possible transducer constellations consisting of at least four loudspeakers and the MDS algorithm is applied on each of the corresponding distance matrixes $M_{sub}$ (or matrixes of other quantities, such as said $t_{ij}$, as mentioned previously). If the stress value of a given sub-set of transducers is less than the first stress value, the transducer(s) that was/were removed from the previous set must have been contributing significantly to the overall error of the co-ordinate estimation. This process of estimation of co-ordinates based on sub-sets of transducers is then repeated for each transducer of the total set of transducers, which makes it possible to determine the contribution to the overall error made by any given transducer. An example of the result of applying the error correction method according to the invention will be given in the detailed description of the invention.

The present invention furthermore relates to a system for estimating the position of N sound-emitting transducers, such as loudspeakers, where $N \geqq 2$, where the system in its broadest aspect comprises:

- generator means for providing a given of said sound-emitting transducers with a test signal that causes said transducer to emit an acoustic test signal that can be picked up by each of the remaining transducers;
- receptor means in each of the transducers for picking up said acoustic test signal at each separate transducer (which receptor means may be the transducer itself, for instance when the transducer is an electro dynamic loudspeaker);
- analysis means for determining the individual propagation times $t_{ij}$ between any given emitting transducer $T_i$ and any given receiving transducer $T_j$ based on said test signal provided to said emitting transducer $T_i$ and on said signal picked up at/by said receiving transducer $T_j$;
- distance determining means for determining the distance between said first and second locations in space by multiplication of corresponding of said propagation times $t_{ij}$ with the propagation speed c of sound;
- multidimensional scaling (MDS) means that based on the distance between each individual pairs of sound-emitting transducers estimates a set of relative co-ordinates $(x_i', y_i', z_i')$ for each of the N individual sound-emitting transducers.

It is noted that as well as in the method according to the invention, as described previously, the said MDS means can alternatively be applied on for instance the individual propagation times $t_{ij}$ in stead of being applied on the derived distances, and the dimensions/co-ordinates that result from the application of the MDS algorithm can subsequently be converted to space-related co-ordinates or dimensions, e.g. quantities measured in meters.

According to a specific embodiment of a system according to the invention the system comprises:

- generator/analysis means, such as MLS (maximum length sequence) analysis means, for measuring impulse responses $IR_{ij}(t)$ corresponding to sound emission at a first location in space and sound reception at a second location in space;
- propagation time determining means for determining the propagation times corresponding to each of said impulse responses $IR_{ij}(t)$;
- distance determining means for determining the distance between said first and second locations in space by multiplication of corresponding of said propagation times $t_{ij}$ with the propagation speed c of sound;
- multidimensional scaling (MDS) means that based on the distance between each individual pairs of sound-emitting transducers estimates a set of relative co-ordinates ($x_i'$, $y_i'$, $z_i'$) for each of the N individual sound-emitting transducers.

According to one specific embodiment of the system of the invention, the generator/analysis means, the propagation time determining means, the distance determining means and the multidimensional scaling (MDS) means can be integrated as a common position estimating processor means that can be provided at a convenient place in the overall system. One possibility would be to provide this processing means as an integral part of one of the sound-emitting transducers, but it could also be provided elsewhere in the system, for instance as a part of amplifier or pre-amplifier means used to drive the sound-emitting transducers or to process audio signals prior to delivery to these transducers. The various of the above mentioned means could alternatively be distributed over the total system.

According to an embodiment of the invention, sound reception at a second location in space is carried out by a microphone at said second location in space, but—as mentioned previously—it would for some sound-emitting transducers also be possible to use the individual transducers as sound receptors instead of separate microphones.

The system according to the present invention may furthermore comprise means for storing said set of measured impulse responses $IR_{ij}(t)$ and/or said distance matrix M and/or said relative co-ordinates ($x_i'$, $y_i'$, $z_i'$) and/or said room-related co-ordinates (x, y, z). The system may furthermore be provided with means for carrying out the error corrections mentioned previously either automatically or on request of or guided by a user.

BRIEF DESCRIPTION OF THE DRAWINGS

The invention will be better understood with reference to the following detailed description of specific embodiments of the invention in conjunction with the figures, where.

DETAILED DESCRIPTION OF THE INVENTION

Figure 1:
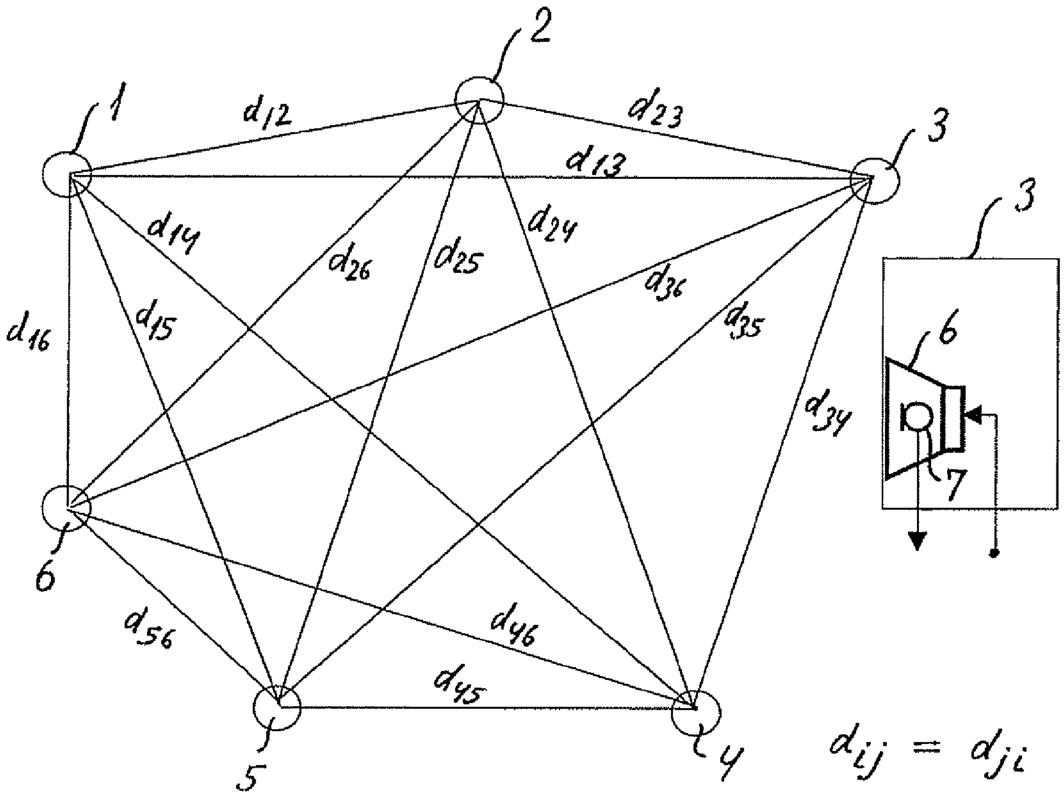
FIG. 1 schematically illustrates an arbitrary loudspeaker set-up comprising six loudspeakers, where the distances $d_{ij}$ between the various loudspeakers are defined.

With reference to FIG. 1 there is schematically illustrated a loudspeaker set-up comprising six loudspeakers 1, 2, 3, 4, 5 and 6, where the distances $d_{ij}$ between the various loudspeakers are defined. Each of the loudspeakers is in the shown embodiment of the invention provided with a separate microphone 7 which as schematically shown can be positioned for instance directly in front of the diaphragm of the loudspeaker driver 6, although other positions of the microphone could also be chosen. It should be noted as previously mentioned that it might alternatively be possible to apply the loudspeaker driver itself as a "microphone".

Figure 2:
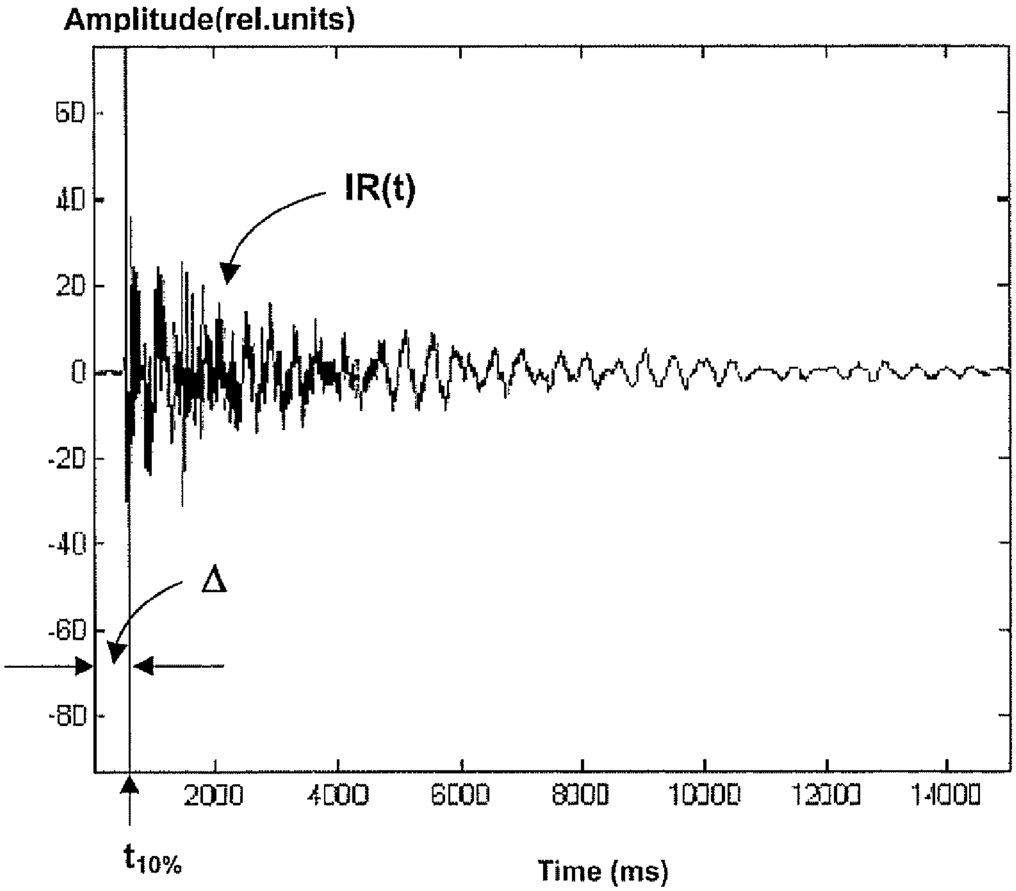
FIG. 2 shows a measured impulse IR(t) and an example of a definition of the propagation time for a sound signal emitted from a first transducer and recorded at a second transducer.

Referring to FIG. 2 there is shown an example of a measured impulse response IR(t) with sound emission from a given loudspeaker and sound recording at a given other loudspeaker in the set-up. Based on the measured impulse response IR(t), the propagation time for sound propagation from the first to the second of the above speakers is estimated as shown in FIG. 2 by (in this example) determining the minimum value (most negative value) of the impulse response and determining the sample where the impulse response reaches a value that is 10% of said minimum value, assuming that this time value corresponds to the time when the first wave front from a given sound-emitting transducer impinges on a given of said other transducers. This 10% time value is indicated by $t_{10\%}$ in FIG. 2 and the estimated propagation time from the first (emitting) to the second (receiving) transducer is indicated by Δ.

Based on measured impulse responses, a distance matrix can be calculated by multiplication of each of the estimated propagation times $t_{ij}$ determined for instance as described above by c, where c is the propagation speed of sound, whereby a distance matrix M comprising all individual distances $d_{ij}$ is obtained, the diagonal elements in the matrix being of course exactly equal to zero. In TABLE 1 below there is shown an example of a distance matrix for a six-loudspeaker set-up, where the first row and column of the matrix corresponds to the first loudspeaker, etc. and where the values in this example are given in meters. Thus for instance, the distance between the first and second loudspeaker is calculated to 0.8711 and 0.8944 meters, respectively ($d_{12}$ and $d_{21}$, respectively), the difference of approximately 0.02 meters being caused by measurement uncertainty of the applied method.

TABLE 1

| Calculated distance matrix for six-loudspeaker set-up |
|---|
| 0 0.8711 1.8433 2.5589 2.4889 1.9833 |
| 0.8944 0 1.0111 2.1933 2.4967 2.3567 |
| 1.8589 1.0111 0 1.7111 2.4033 2.6522 |
| 2.5589 2.1933 1.7189 0 1.0578 1.8356 |
| 2.5044 2.5044 2.4033 1.0656 0 0.9722 |
| 1.9833 2.3489 2.6367 1.8278 0.9644 0 |

Figure 3:
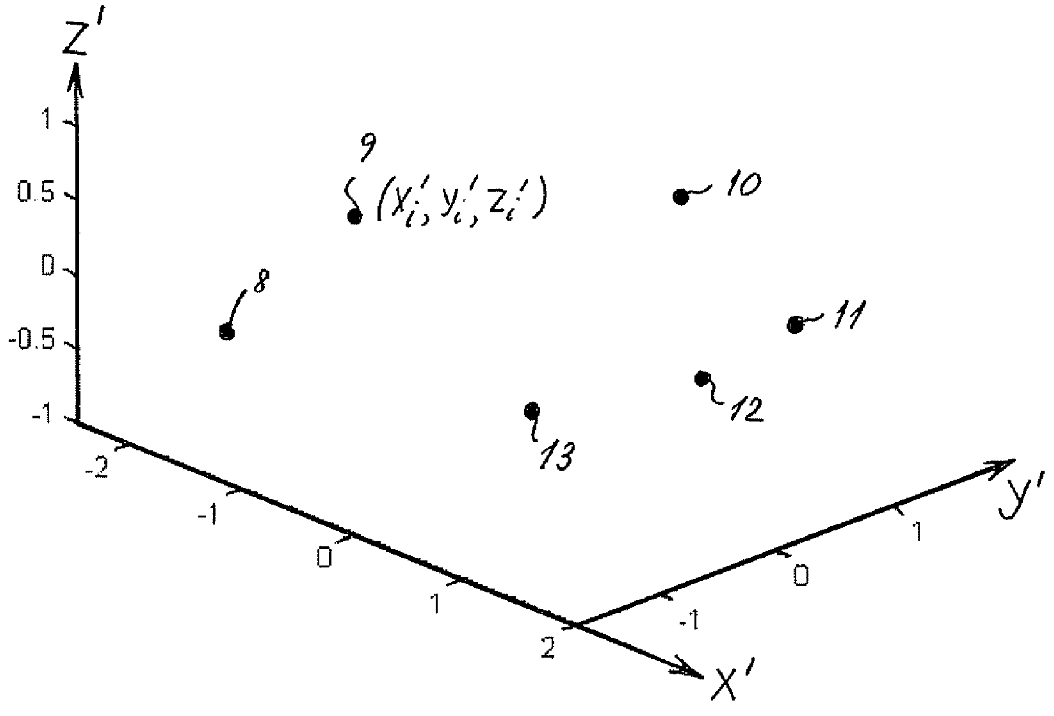
FIG. 3 shows the resultant relative co-ordinates determined on the basis of measured propagation times by the application of multidimensional scaling (MDS) technique.

Using the above distance matrix as input to the MDS algorithm, an estimate of the relative co-ordinates of each of the six loudspeakers can be obtained. Referring to FIG. 3 there is shown the resultant estimated relative co-ordinates of the six loudspeakers determined on the basis of measured propagation times by the application of the MDS technique.

It is understood that the exact locations of the loudspeakers and the corresponding distances shown in FIGS. 1 and 3 are not drawn to scale and that these figures serve only as illustrations of the method according to the invention.

The estimated co-ordinates of the loudspeakers shown in FIG. 3 are only relative (hence the designation using primed letters ($x_i'$, $y_i'$, $z_i'$) in FIG. 3) and it will generally be necessary to carry out a linear transform (for instance rotation and/or translation) of the estimated co-ordinates ($x_i'$, $y_i'$, $z_i'$) to arrive at the final co-ordinates (x, y, z) matching the set-up of loudspeakers in an actual listening room.

The determination of the acoustic centres of the various loudspeakers applying the method according to the invention is quite accurate, on one hand due to the large amount of measurements that are provided to the MDS algorithm and on the other hand due to the additional possibility of making the measurements in an up-sampled mode (with a sampling frequency of 44.1 kHz, one sample is only 0.7 cm long). Applying the method according to the invention it has been found possible to determine the co-ordinates of the loudspeakers with an accuracy of down to 5 cm.

It was initially mentioned that certain room-shapes or the presence of obstacles, such as furniture etc. in the room, could lead to problems of accurately determining the positions of the loudspeakers in the room. The following numerical example is an illustration of the determination of loudspeaker co-ordinates in the special case of an L-shaped room, where sound emitted by a given loudspeaker for measuring the corresponding impulse response can not propagate directly to one or more given other loudspeakers. This special situation was briefly mentioned in the summary of the invention and the result in practice of using the proposed correction method based on the stress values provided by the MDS algorithm will be dealt with in more detail in the following, where illustrative examples will also be given.

As the stress value of the MDS algorithm is an indicator used to judge the goodness of fit of the calculated mapping solution, i.e. the calculated relative co-ordinates of the transducers, this value has to be reduced in order to increase the goodness (accuracy of the determination of the relative co-ordinates) in an error correction process.

The MDS algorithm does not provide an indication of from which distance measurement an error originates, as the error can only generally be seen as a large stress value. According to the invention, there is provided an error correction method comprising breaking up the transducer constellation into smaller subgroups of transducers and analysing the stress values corresponding to each of these subgroups. As mentioned previously, the smallest possible subgroup for a two-dimensional set-up of loudspeakers will be a four-transducer constellation, as a group of two or three transducers will always have a mapping solution with a stress value of zero.

In the following, two examples illustrating the error correction method according to the invention will be given.

EXAMPLE 1

This example relates to a set-up comprising seven loudspeakers. The correct (x, y) co-ordinates of the seven loudspeakers and the corresponding, correct distance matrix are shown in TABLE 2 and TABLE 3 below.

TABLE 2

| Correct co-ordinates | | |
|---|---|---|
| Speaker no: | X | Y |
| 1 | −7.0711 | 0.8081 |
| 2 | −2.8284 | −3.4345 |
| 3 | 0 | −4.8487 |
| 4 | 2.8284 | −3.4345 |
| 5 | 7.0711 | 0.8081 |
| 6 | 2.8284 | 5.0508 |
| 7 | −2.8284 | 5.0508 |

TABLE 3

| Correct distances (distance matrix M) | | | | | | |
|---|---|---|---|---|---|---|
| 0 | 6.0000 | 9.0554 | 10.7703 | 14.1421 | 10.7703 | 6.0000 |
| 6.0000 | 0 | 3.1623 | 5.6569 | 10.7703 | 10.1980 | 8.4853 |
| 9.0554 | 3.1623 | 0 | 3.1623 | 9.0554 | 10.2956 | 10.2956 |
| 10.7703 | 5.6569 | 3.1623 | 0 | 6.0000 | 8.4853 | 10.1980 |
| 14.1421 | 10.7703 | 9.0554 | 6.0000 | 0 | 6.0000 | 10.7703 |
| 10.7703 | 10.1980 | 10.2956 | 8.4853 | 6.0000 | 0 | 5.6569 |
| 6.0000 | 8.4853 | 10.2956 | 10.1980 | 10.7703 | 5.6569 | 0 |

Based on the impulse response measuring technique described above, the erroneous distance matrix $M_{err}$ shown in TABLE 4 has been obtained, the distances between loudspeakers 6 and 7 being in this example erroneously estimated due to the placement in an L-shaped room, where the direct propagation path between loudspeakers 6 and 7 is blocked due to the boundaries of the room:

TABLE 4

| Erroneously estimated distances (distance matrix $M_{err}$) | | | | | | |
|---|---|---|---|---|---|---|
| 0 | 5.9931 | 9.0381 | 10.7709 | 14.1388 | 10.9944 | 6.0106 |
| 5.9931 | 0 | 3.1689 | 5.6438 | 10.7817 | 10.1784 | 8.4946 |
| 9.0381 | 3.1689 | 0 | 3.1749 | 9.0701 | 10.2691 | 10.2878 |
| 10.7709 | 5.6438 | 3.1749 | 0 | 5.9974 | 8.4333 | 10.2020 |
| 14.1388 | 10.7817 | 9.0701 | 5.9974 | 0 | 6.0161 | 10.9747 |
| 10.9944 | 10.1784 | 10.2691 | 8.4333 | 6.0161 | 0 | 8.0076 |
| 6.0106 | 8.4946 | 10.2878 | 10.2020 | 10.9747 | 8.0076 | 0 |

When the above erroneous distance matrix $M_{err}$ is entered into the MDS algorithm and an attempt is made by the algorithm to describe this matrix by the co-ordinates of seven loudspeakers, the following erroneous estimate of co-ordinates of the loudspeakers shown in TABLE 5 is obtained:

TABLE 5

| Erroneously estimated co-ordinates | | |
|---|---|---|
| Speaker no: | X | Y |
| 1 | −7.021 | 0.9863 |
| 2 | −2.7842 | −3.312 |
| 3 | 0.0087 | −4.7747 |
| 4 | 2.7971 | −3.2947 |
| 5 | 7.0121 | 1.0171 |
| 6 | 3.2954 | 4.6646 |
| 7 | −3.2907 | 4.7134 |

The MDS algorithm provides a stress value, which in the case of the co-ordinates given in TABLE 5 is equal to 0.0481, which indicates that the MDS algorithm has not been able to provide an acceptable fit of the estimated co-ordinates of loudspeakers corresponding to the distances given in the matrix of TABLE 4.

Comparing the above erroneously estimated co-ordinates with the correct co-ordinates given in TABLE 2, it immediately appears that the co-ordinates of loudspeakers 6 and 7 deviate much more from the correct co-ordinates of TABLE 2 than the co-ordinates of loudspeakers 1, 2, 3 and 4. This comparison is carried out in TABLE 6:

TABLE 6

| Differences between correct and erroneously estimated co-ordinate | | | |
|---|---|---|---|
| Speaker no: | X | Y | $\sqrt{x^2 + y^2}$ |
| 1 | −0.0501 | −0.1782 | 0.1851 |
| 2 | −0.0442 | −0.1225 | 0.1302 |

TABLE 6-continued

| Differences between correct and erroneously estimated co-ordinate | | | |
|---|---|---|---|
| Speaker no: | X | Y | $\sqrt{x^2 + y^2}$ |
| 3 | 0.0087 | −0.074 | 0.0745 |
| 4 | 0.0313 | −0.1398 | 0.1433 |
| 5 | 0.059 | −0.209 | 0.2172 |
| 6 | −0.467 | 0.3862 | 0.6060 |
| 7 | 0.4623 | 0.3374 | 0.5723 |

Now, applying the correction method according to the invention based on successive removal of a loudspeaker from the total set of loudspeakers, as described previously, the set of corrected co-ordinates with a stress value of 0.000807 shown in TABLE 7 is arrived at:

TABLE 7

| Corrected co-ordinates | | |
|---|---|---|
| Speaker no: | X | Y |
| 1 | −7.0742 | 0.8065 |
| 2 | −2.8339 | −3.4303 |
| 3 | −0.019 | −4.839 |
| 4 | 2.8285 | −3.4296 |
| 5 | 7.0666 | 0.8243 |
| 6 | 2.8659 | 5.0092 |
| 7 | −2.8338 | 5.0588 |

That the above set of corrected co-ordinates indeed represents a very satisfactory estimation of the correct co-ordinates of the seven loudspeakers appears from TABLE 8, where the difference between correct and corrected co-ordinates is given.

TABLE 8

| Differences between correct and corrected co-ordinates | | | |
|---|---|---|---|
| Speaker no.: | X | Y | $\sqrt{x^2 + y^2}$ |
| 1 | 0.0031 | 0.0016 | 0.0035 |
| 2 | 0.0055 | −0.0042 | 0.0069 |
| 3 | 0.019 | −0.0097 | 0.0213 |
| 4 | −0.0001 | −0.0049 | 0.0049 |
| 5 | 0.0045 | −0.0162 | 0.0168 |
| 6 | −0.0375 | 0.0416 | 0.0560 |
| 7 | 0.0054 | −0.008 | 0.0097 |

Referring to TABLE 8, the positions of the individual loudspeakers have thus been estimated with a maximum error of less than 6 cm.

EXAMPLE 2

Figure 4:
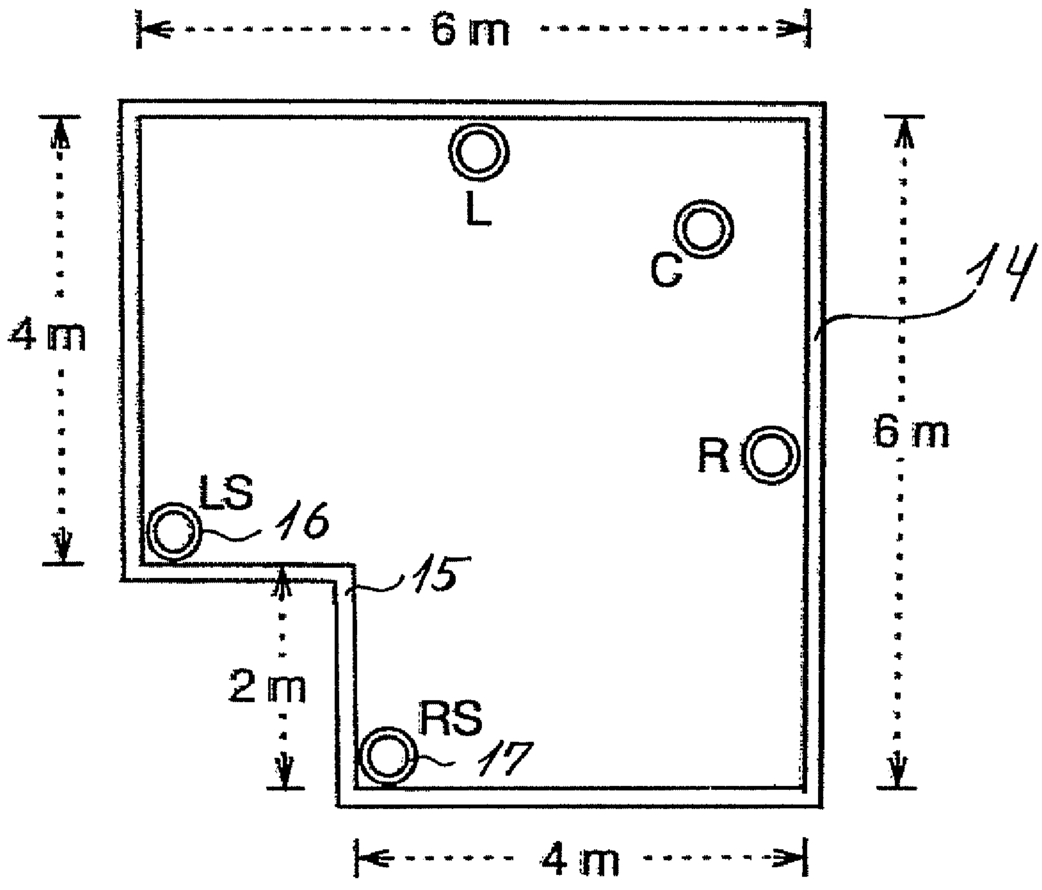
FIG. 4 shows an illustrative example of a five-loudspeaker set-up in an L-shaped room, the example illustrating the application of the error correction method according to the invention.

With reference to FIG. 4, the following example relates to a simulated five-loudspeaker set-up (a typical surround sound set-up comprising front left loudspeaker (L), front fight loudspeaker (R), centre loudspeaker (C) and the left and right surround loudspeakers LS and RS, respectively, the latter designated by reference numerals 16 and 17, respectively) in an L-shaped room 14. The surround loudspeakers 16 and 17 are placed on either side of protruding wall portions 15, which prevent direct sound propagation between the surround loudspeakers 16 and 17.

Figure 5:
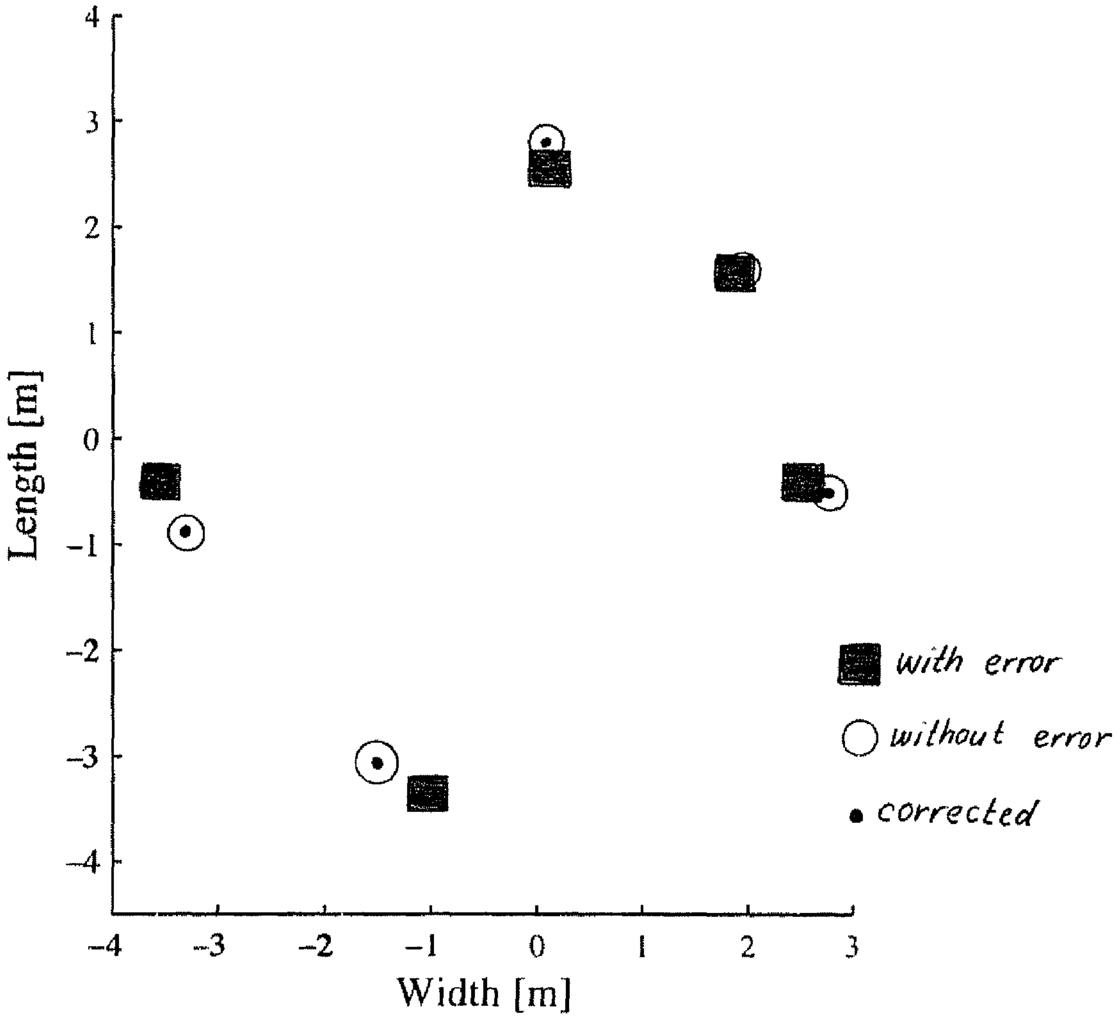
FIG. 5 shows mapping of the loudspeakers of FIG. 4 obtained according to the invention with errors caused by the placement of the surround loudspeakers in the L-shaped room and with these errors removed by the application of the error correction method according to the invention.

Referring to FIG. 5, there is shown a mapping of the loudspeakers of FIG. 4 obtained according to the invention with errors caused by the placement of the surround loudspeakers in the L-shaped room and with these errors removed by the application of the error correction method according to the invention. Specifically the correct positions of the loudspeakers are indicated by open circles ("without error") and the erroneously determined positions are indicated by the filled squares ("with error"). The application of the error correction method according to the invention has yielded the corrected positions of the loudspeakers indicated by the dots ("corrected") and it is immediately apparent that the application of the error correction method according to the invention has practically removed the errors.

TABLE 9

| Correct (unknown) distance between loudspeakers in FIG. 4 | | | | |
|---|---|---|---|---|
| 0 | 2.2361 | 4.2426 | 6.0828 | 5.0000 |
| 2.2361 | 0 | 2.2361 | 5.8310 | 5.8310 |
| 4.2426 | 2.2361 | 0 | 5.0000 | 6.0828 |
| 6.0828 | 5.8310 | 5.0000 | 0 | 2.8284 |
| 5.0000 | 5.8310 | 6.0828 | 2.8284 | 0 |

The actually determined and erroneous distances between each of the loudspeakers are given in TABLE 10:

TABLE 10

| Distance matrix with errors on the distances between loudspeakers 16 and 17 (the surround loudspeakers). | | | | |
|---|---|---|---|---|
| 0 | 2.2361 | 4.2426 | 6.0828 | 5.0000 |
| 2.2361 | 0 | 2.2361 | 5.8310 | 5.8310 |
| 4.2426 | 2.2361 | 0 | 5.000 | 6.0828 |
| 6.0828 | 5.8310 | 5.0000 | 0 | 4.2000 |
| 5.0000 | 5.8310 | 6.0828 | 4.2000 | 0 |

It appears from the results of TABLE 10 and from the representation of FIG. 5 that the distance between the surround loudspeakers 16 and 17 has been determined too large due to the protruding wall portion 15 preventing direct sound propagation between these loudspeakers. Also the positions of the two front loudspeakers (L and R) are erroneous although not to the same extent as the surround loudspeakers.

The stress value is the indicator used according to the invention for judging the goodness of fit of the calculated mapping solution. Therefore, it is this value that has to be reduced to gain an increase in the quality of the solution during an error correction process. Considering all possible four-loudspeaker constellations in the set-up shown in FIG. 4, it is possible to arrive at the conclusion that all constellations containing only one of the surround loudspeakers 16, 17 have a stress value of zero. The constellation containing both surround speakers 16 and 17 has a stress value of 0.04. From this information it can be concluded that the distance measured between the surround loudspeakers is erroneous and hence requires correction.

The error correction method according to the invention uses the stress value found in all four-loudspeaker constellations. However, the stress value is independent on the actual misplacement (being in this case defined as the distance between the actual and the calculated loudspeaker locations), but dependent on the overall scale of the set-up.

Multiplication of all distances in the set-up by a scaling factor will result in the same stress value but a greater displacement. Depending on the size of a set-up, it is thus possible to obtain an ideal stress value, but at the same time arrive at a misplacement that is outside given, defined tolerances. Consequently, according to a preferred embodiment of error detection according to the invention more information is included in the error detection. Such information is according to an embodiment obtained by integration of the averaged distances between the loudspeakers into the error detection algorithm, thereby taking the scaling factor into account.

Thus, in the present five-loudspeaker example, taking the independent stress values for the four-loudspeaker constellations and multiplying these by the average distance between those speakers, size-dependent error values for the actual misplacement in the groups are derived.

The summation of all values in an error matrix results in an error value for the correspondent distance matrix value. The highest value in the error matrix corresponds to the largest error in the distance matrix. An error matrix for the distance matrix with errors shown in TABLE 10 and obtained along the lines outlined above is shown in TABLE 11:

TABLE 11

Error matrix for five-loudspeaker set-up

| | | | | |
|---|---|---|---|---|
| 0 | 0.2070 | 0.2676 | 0.4746 | 0.47466 |
| 0.2070 | 0 | 0.2070 | 0.4140 | 0.4140 |
| 0.2676 | 0.2070 | 0 | 0.4746 | 0.4746 |
| 0.4746 | 0.4140 | 0.4746 | 0 | 0.6816 |
| 0.4746 | 0.4140 | 0.4746 | 0.6816 | 0 |

The entire error correction method according to the invention comprises basically two steps: (1) Error detection, including identification of those distances of the distance matrix that are erroneous; and (2) Error correction. Error detection and identification of erroneous distances was exemplified above.

Step 2, i.e. the error correction step is a mathematical optimisation problem, generally consisting of maximising or minimising the return of a function by systematically choosing values for the variables. In the present context, the value which must be minimised is the stress value derived from the MDS algorithm. The function is the MDS algorithm itself, and the variables are the distances found by the error detection algorithm, as described above. There exist several systematic methods for solving optimisation problems, such as the Nelder-Mead optimisation method.

Applying the optimisation algorithm it is necessary to implement the process in a loop, as often a desired maximum stress value (of for instance 0.01, which is the value used for arriving at the corrected locations of loudspeakers in FIG. 5) cannot be obtained by simple alteration of initial distances found by the error detection algorithm.

If the optimisation algorithm stopped due to one of a set of termination criteria and the desired stress value was not yet reached, the error detection algorithm was according to an embodiment of the error correction method of the invention again repeated utilising the previously corrected distance matrix.

From the resulting altered distance matrix, the error detection algorithm computes a new (different) error matrix and a different threshold value for the determination of the distances to correct (i.e. those distances that need correction), giving the minimisation algorithm new values to optimise.

If this algorithm still does not result in a decrease of the overall stress value, the threshold level for the error matrix is lowered, so that more distances are corrected on the basis of the identical error matrix.

If even this approach does not result in the desired maximum stress value, the entire set of distances can be provided as variables to the optimisation algorithm. However, investigations have shown that in most scenarios, the desired maximum stress value was already reached after the second iteration of the optimisation algorithm. The application of the above outlined method of error correction according to the invention is shown in FIG. 5, where the initially determined, erroneous positions of the loudspeakers indicated by filled squares ("with error") in FIG. 5 have been corrected as indicated by the dots ("corrected") and compared with the correct positions of the loudspeakers indicated by the open circles ("without error"). The error correction method according to the invention is seen to provide very satisfactory results for the L-shaped room and loudspeaker set-up shown in FIG. 4. The overall stress value after the correction shown in FIG. 5 is as low as 0.0000004.

Figure 6:
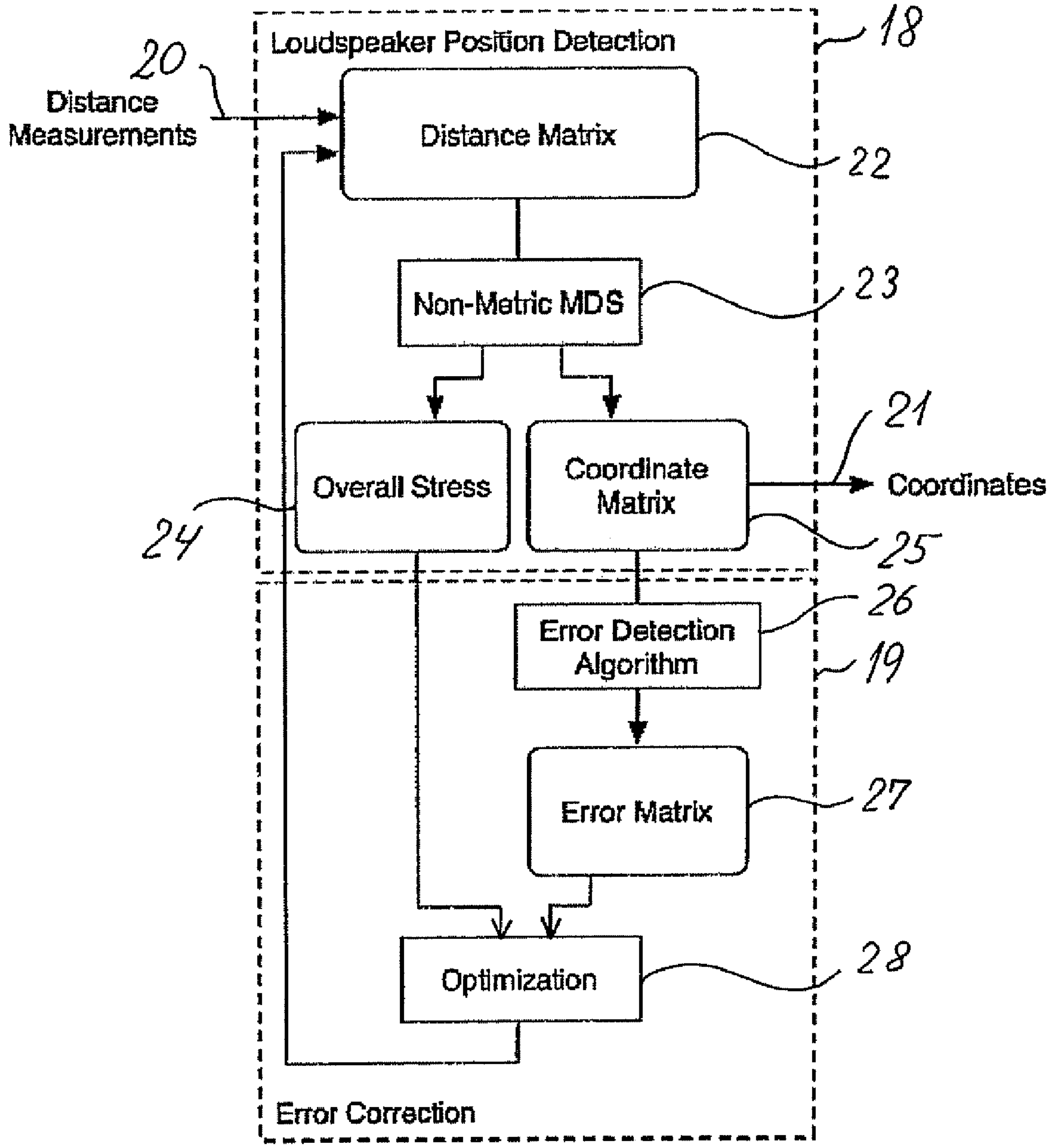
FIG. 6 shows a schematic block diagram illustrating the error correction method (and a corresponding system) according to the invention.

Referring to FIG. 6 there is shown a schematic block diagram illustrating the error correction method (and a corresponding system) according to the invention in co-operation with the loudspeaker position detection algorithm according to the invention. The system shown in FIG. 6 comprises the loudspeaker position detection block 18 and the error identification/correction block 19. The loudspeaker position detection block 18 receives distance measurements 20, for instance provided by means of the impulse response technique described previously, and these measurements are represented in the system as a distance matrix 22 and for instance stored in memory in the system. Based on this distance matrix 22, a MDS algorithm 23 determines a co-ordinate matrix 25 and the corresponding overall stress value 24. If this value is within an acceptable limit, the determined co-ordinates are provided as the result 21 of the system. If the overall stress value 24 exceeds the acceptable limit, an iterative optimisation process is initiated, carried out by the error identification/correction block 19 in FIG. 6.

The erroneous co-ordinate matrix is provided to the error detection algorithm 26 described previously resulting in the error matrix 27. The error matrix 27 and the overall stress value 24 are provided to the optimisation algorithm 28, which optimises the distance matrix 22. An iterative loop is thus established, where an updated, corrected distance matrix forms the basis for the determination of an updated co-ordinate matrix and corresponding overall stress value. If this updated stress value is below a given acceptable limit, the final co-ordinate matrix is provided (reference numeral 21) as the result of the iterative process.

Figure 7:
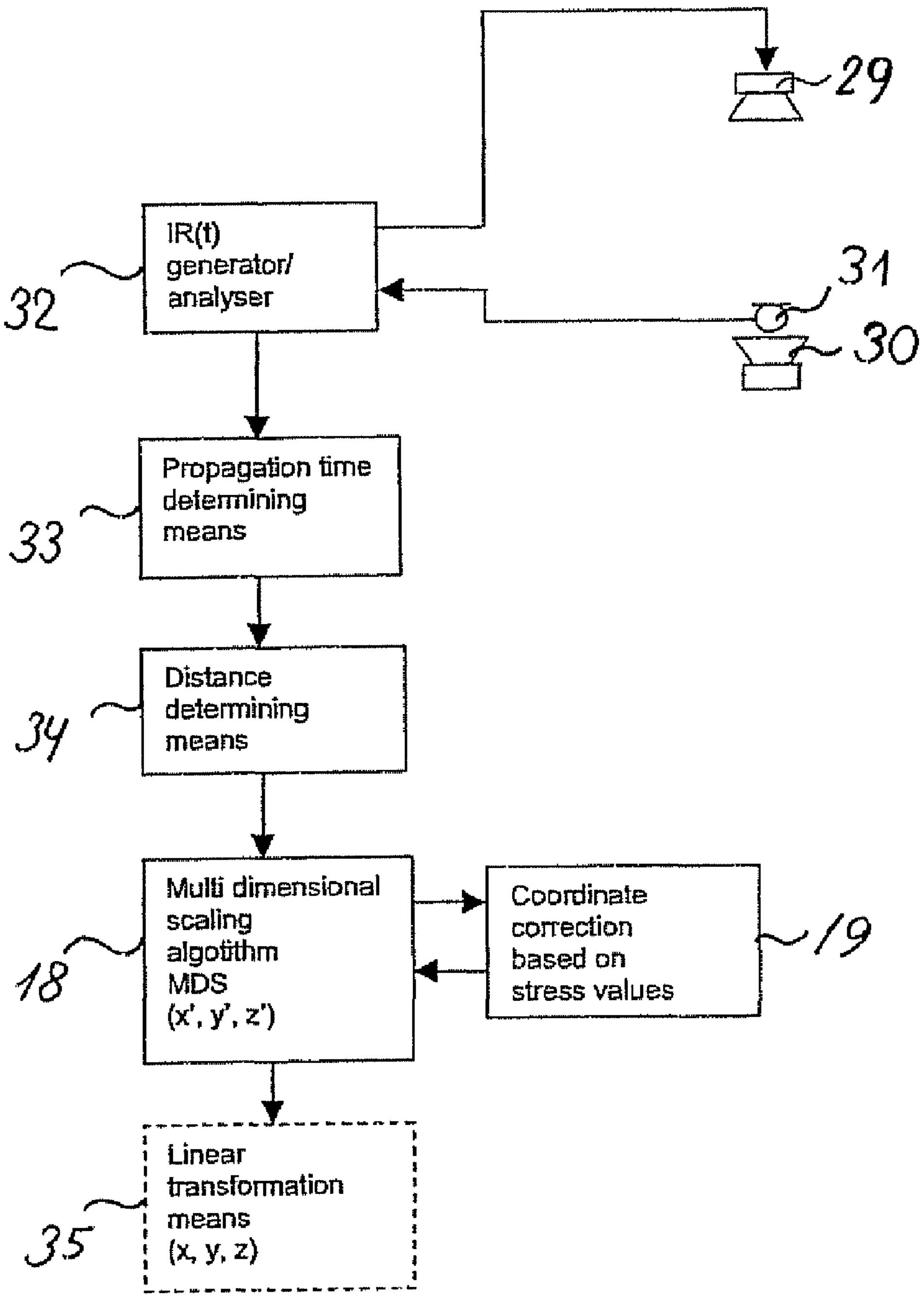
FIG. 7 shows a schematic representation in the form of a block diagram of an embodiment of a system for loudspeaker position estimation according to the invention.

Referring to FIG. 7 there is shown a schematic embodiment of a system according to the invention for determining the positions of the individual loudspeakers in a set-up. The system basically comprises the shown functional blocks, but it is understood that in an actual implementation at least some of these may be integrated and that further functional blocks may be added to the system without departing from the scope of the invention. The basic functional blocks are as follows:

(a) generator/analysis means 32, such as MLS (maximum length sequence) analysis means, for measuring impulse responses $IR_{ij}(t)$ corresponding to sound emission at a first location in space and sound reception at a second location in space. The generator/analysis means 32 provides an output signal to a first loudspeaker 29 (if needed through a suitable power amplifier, not shown) and at a second loudspeaker 30 the sound emitted by loudspeaker 29 is picked up by microphone 31 preferably located substantially at the acoustical centre of the second loudspeaker. The generator/analysis means 32 may also comprise control means for automatically switching through the total set of loudspeaker combinations in the given set-up. The generator/analysis means 32 may furthermore comprise storage means for storing the individual impulse responses of each loudspeaker combination (b) propagation time determining means 33 for determining the propagation times $t_{ij}$ corresponding to each of the (stored) impulse responses $IR_{ij}(t)$, for instance utilising the technique described in previous paragraphs above.

(c) distance determining means 34 for determining the distance between the first 29 and second 30 locations in space by multiplication of corresponding of said propagation times $t_{ij}$ with the propagation speed c of sound.

(d) multidimensional scaling (MDS) means (algorithm) 18 that based on the distance between each individual pairs of sound-emitting transducers (i.e. on the distance matrix M) estimates a set of relative co-ordinates ($x_i'$, $y_i'$, $z_i'$) for each of the N individual sound-emitting transducers. The MDS algorithm also provides the stress values describing the goodness of fit of the determined co-ordinates, and the stress values can be used (indicated by reference numeral 19), if desired/required, as described in previous paragraphs to improve the accuracy of the determined relative co-ordinates ($x_i'$, $y_i'$, $z_i'$).

(e) optional linear transformation means/algorithm 35 to translate/rotate the determined relative co-ordinates into a set of co-ordinates relating to the particular environments (for instance a listening room).

As previously mentioned, the MDS algorithm may alternatively be applied directly on the propagation times in stead of being applied on the corresponding distances. Thus, the input to the MDS algorithm could alternatively be a propagation time matrix T instead of the distance matrix M and the conversion to co-ordinates in meters could be performed after the application of the MDS algorithm 18 and the corresponding co-ordinate correction 19.

The invention claimed is:

1. A method for estimating a position of N sound-emitting transducers, where $N \geqq 2$, where the method comprises the following steps:

a) determining individual distances $d_{ij}$, or quantities uniquely defining these distances, between any given sound-emitting transducer ($T_i$) and each of the remaining sound-emitting transducers ($T_j$);

b) based on said individual distances $d_{ij}$ between any given sound-emitting transducer ($T_i$) and each of the remaining sound-emitting transducers ($T_j$), i.e. based on a distance matrix M comprising the individual determined distances $d_{ij}$ or based on said other determined quantities, estimating relative co-ordinates ($x_i'$, $y_i'$, $z_i'$) of each of said sound-emitting transducers ($T_1, T_2, \ldots T_N$) by a multidimensional scaling (MDS) technique or algorithm;

c) executing an error identification and correction when an overall stress value provided by said MDS algorithm exceeds a given maximum value, said executing step including the steps of subdividing said distance matrix M into sub-matrixes, thereby providing stress values for each of these sub-matrixes, and determining that the or those sub-matrixes resulting in stress values outside a given tolerance region comprise at least one pair of transducers, the determined distance between which is erroneous;

d) providing the co-ordinates of the pair of said at least one pair of transducers to an error detection algorithm thereby providing an error matrix;

e) providing said error matrix and said overall stress value to an optimization algorithm that optimizes said distance matrix;

f) based on the optimized distance matrix, estimating the relative co-ordinates ($x_i'$, $y_i'$, $z_i'$) of each of said sound-emitting transducers ($T_1, T_2, \ldots T_N$) by the multidimensional scaling (MDS) technique or algorithm thereby obtaining an updated stress value;

g) comparing said updated stress value with said given tolerance region of stress values and repeating steps (c) through (f) until said updated stress value is outside said tolerance; and h) when the updated stress value is outside said tolerance region, providing the relative co-ordinates that are based on the optimized distance matrix as the result of the preceding steps.

2. A method according to claim 1 for estimating the position of N sound-emitting transducers, where $N \geqq 2$, the method further comprising the following steps:

for each pair (i, j) of sound-emitting transducers ($T_1$, $T_2, \ldots T_N$) determining an impulse response $IR_{ij}(t)$ by emitting an acoustic signal from one of said transducers of a given pair (i, j) of transducers and recording a resultant acoustic signal at the other transducer of the given pair (i, j) of transducers, thereby attaining a set of impulse responses $IR_{ij}(t)$ for each of said pairs of sound-emitting transducers;

based on said determined set of impulse responses $IR_{ij}(t)$, determining propagation times $t_{ij}$ for sound propagation from any given sound-emitting transducer ($T_i$) to any other given sound-emitting transducer ($T_j$);

based on said propagation times $t_{ij}$, determining individual distances $d_{ij}$ between any given sound-emitting transducer ($T_i$) and the remaining sound-emitting transducers ($T_j$) by multiplication of each of said propagation times $t_{ij}$ by c, where c is the propagation speed of sound, whereby a distance matrix M is provided;

based on said individual distances $d_{ij}$ between any given sound-emitting transducer ($T_i$) and the remaining sound-emitting transducers ($T_i$) or on said distance matrix M, estimating the relative co-ordinates ($x_i'$, $y_i'$, $z_i'$) of each of said sound-emitting transducers ($T_1$, $T_2, \ldots T_N$) by the multidimensional scaling (MDS) technique or algorithm.

3. A method according to claim 2, wherein the acoustic signal emitted from a given transducer is recorded at one of the N-1 remaining transducers at a time.

4. A method according to claim 2, wherein the acoustic signal emitted from a given transducer is recorded at all of the remaining N-1 transducers simultaneously.

5. A method according to claim 2, where said impulse responses $IR_{ij}(t)$ are determined using maximum length sequence (MLS) measurements.

6. A method according to claim 2, where said recording of the emitted measurement signal is attained by a microphone provided as an integral part of each of said sound-emitting transducers.

7. A method according to claim 2, where said recording of the emitted measurement signal is attained by each of said sound-emitting transducers themselves, each transducer being able to function both as a sound-emitting transducer and as a sound-recording transducer.

8. A method according to claim 2, where said propagation times $t_{ij}$ are determined on the basis of said impulse responses $IR_{ij}(t)$ by determining the maximum value or the minimum value of the impulse response and determining the sample where the impulse response reaches a value that is V % of said maximum or minimum value.

9. A method according to claim 8, where V is 10%.

10. A method according to claim 1, where stress values provided by the MDS algorithm are used to improve co-ordinate estimation.

11. A method according to claim 1, where said erroneously determined distances or said other erroneously determined other quantities uniquely defining these distances are corrected by an iterative optimisation algorithm.

12. A method according to claim 1, where room-related co-ordinates (x, y, z), relating to a specific room in which the sound-emitting transducers are positioned, are obtained from said relative co-ordinates ($x_i'$, $y_i'$, $z_i'$) by a linear transformation of the relative co-ordinates ($x_i'$, $y_i'$, $z_i'$).

13. A system for estimating a position of N sound-emitting transducers, where $N \geqq 2$, where the system comprises:

a generator which provides a given one of said sound-emitting transducers with a test signal that causes said given transducer to emit an acoustic test signal that can be picked up by each of the remaining said transducers;

a receptor in each of the transducers for picking up said acoustic test signal at each separate receiving said transducer;

an analyzer which determines individual propagation times $t_{ij}$ between each said given emitting transducer $T_i$ and each said receiving transducer $T_j$ based on said test signal provided to said emitting transducer $T_i$ and on said signal picked up by said receiving transducer $T_j$;

a distance calculator which calculates a distance between said first and second locations in space by multiplication of corresponding ones of said propagation times $t_{ij}$ with the propagation speed c of sound;

a multidimensional scaling (MDS) estimator which estimates, based on the determined distance between respective ones of said sound-emitting transducers, a set of relative co-ordinates ($x_i'$, $y_i'$, $z_i'$) for each of the N individual sound-emitting transducers;

an error identification and correction mechanism, forming part of an iterative optimisation loop together with a position detection part, which subdivides a matrix M comprising the individual determined distances $d_{ij}$ into sub-matrixes, which applies the MDS algorithm on each of said sub-matrixes, which thereby provides stress values for each of these sub-matrixes, which determines that the or those sub-matrix(es) resulting in stress value(s) outside a given tolerance region comprise at least one pair of transducers, the determined distance between which is erroneous, which provides the co-ordinates of the pair of said at least one pair of transducers to an error detection algorithm thereby producing an error matrix;

which provides said error matrix and said overall stress value to an optimization algorithm that optimizes said distance matrix;

which, based on the optimized distance matrix, estimates the relative co-ordinates ($x_i'$,$y_i'$, $z_i'$) of each of said sound-emitting transducers ($T_1$, $T_2$, . . . $T_N$) by the multidimensional scaling (MDS) technique or algorithm thereby obtaining an updated stress value;

which compares said updated stress value with said given tolerance region of stress values and which utilizes the iterative optimization loop until said updated stress value is outside said tolerance; and when the updated stress value is outside said tolerance region, which provides the relative co-ordinates that are based on the optimized distance matrix.

14. A system according to claim 13, where the system furthermore comprises a linear transformer which provides room-related co-ordinates (x, y, z), relating to a specific room in which the sound-emitting transducers are positioned, obtained from said relative co-ordinates ($x_i'$, $y_i'$, $z_i'$) by a linear transformation of the relative co-ordinates ($x_i'$, $y_i'$, $z_i'$).

15. A system according to claim 13, where said generator, analyzer, calculator, and multidimensional scaling (MDS) estimator are integrated as a common position estimating processor.

16. A system according to claim 15, where said common position estimating processor is provided as an integral part of one of said sound-emitting transducers.

17. A system according to claim 13, where sound reception at a second location in space is carried out by a microphone at said second location in space.

18. A system according to claim 13, where sound reception at a second location in space is carried out by a sound-emitting transducer at said second location in space, where said sound-emitting transducer can also function as a sound-recorder.

19. A system according to claim 13, further comprising a storage which stores said set of measured impulse responses $IR_{ij}(t)$ and/or said distance matrix M and/or said relative co-ordinates ($x_i'$, $y_i'$, $z_i'$) and/or said room-related co-ordinates (x, y, z).

* * * * *